May 1, 1928. 1,668,158

G. E. KRAUSE

WATER SUPPLYING MEANS FOR INTERNAL COMBUSTION ENGINES

Filed March 6, 1926

Inventor
Gustav E. Krause
By Watson E. Coleman.
Attorney

Patented May 1, 1928.

1,668,158

UNITED STATES PATENT OFFICE.

GUSTAV E. KRAUSE, OF FALL CREEK, WISCONSIN.

WATER-SUPPLYING MEANS FOR INTERNAL-COMBUSTION ENGINES.

Application filed March 6, 1926. Serial No. 92,843.

This invention relates to means for introducing water in relatively small quantities into the fuel stream of an engine using kerosene or other like hydrocarbons as fuel.

The general object of this invention is to provide a very simple and positively operating device of this character by which water may be discharged in regulatable quantities and not in the form of vapor, into the fuel stream of a kerosene or like engine.

I have found in actual practice that if water is discharged into the fuel stream of a kerosene driven engine the same amount of power can be developed as if gasoline were used as the fuel and further I have found that backfiring, spitting, knocking and stopping after the load is off the engine is all avoided when water is allowed to enter the fuel stream.

My invention is illustrated in the accompanying drawings wherein:—

Figure 1:
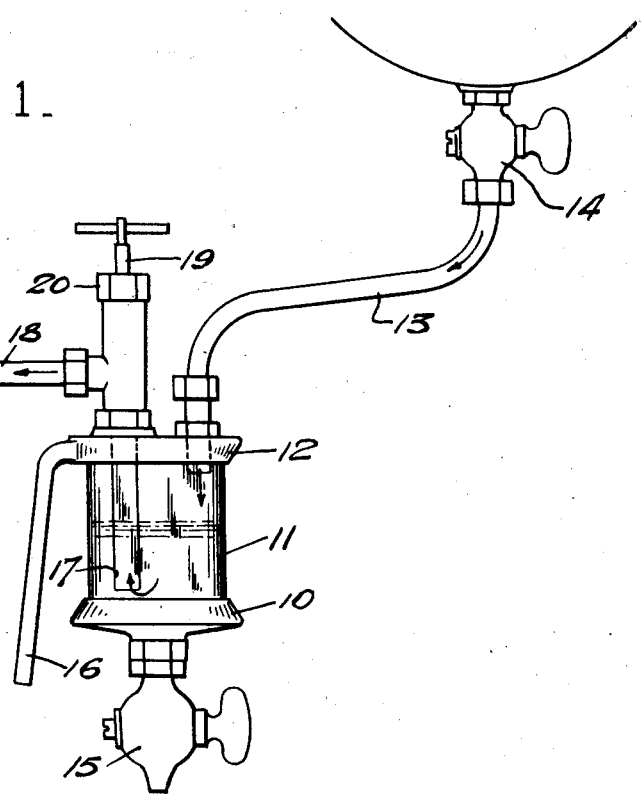
Figure 1 is a side elevation of my improved water supplying device for engines.
Figure 2:
Figure 2 is a vertical sectional view through the chamber 11 and the opposite heads.
Figure 2:
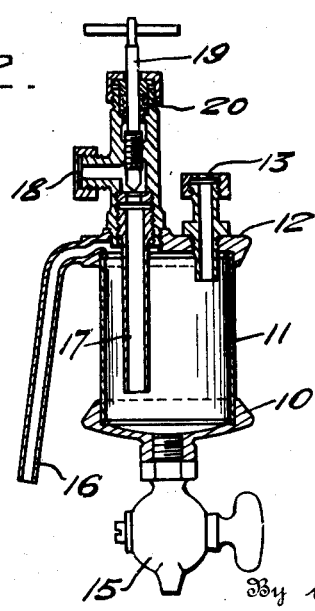
Figure 3:
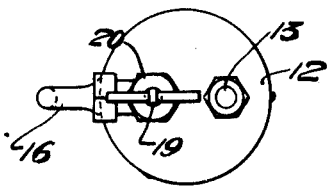
Figure 3 is a top plan view of the structure shown in Figure 2.

Referring to these drawings it will be seen that my water feeding device comprises a metallic base 10 having thereon the cylinder 11 which may be of glass or other suitable material and closed at its top by a head 12. A feed pipe 13 enters this head 12 and leads to any suitable source of supply, this pipe 13 being provided with a water controlling valve 14. The bottom head 10 is provided with a drip cock or drainage cock 15 of any usual or suitable type. The upper head 12 has leading therefrom the water overflow pipe 16, the inner opening of which is located nearly at the top of the cylinder 11.

A pipe 17 extends downward through the upper head 12 nearly to the bottom of the chamber 11 and extends up through the upper head and is provided with the branch 18 leading to the carbureter C on the engine. A needle valve 19 extends downward through a stuffing box 20 and by adjusting this needle valve the amount of water discharged through the pipe 18 may be controlled.

Attention is called to fact that with this construction the chamber 11 is kept constantly filled with water for the reason that the overflow pipe leads from the upper portion of the chamber and furthermore that the outlet pipe 18 extends downward nearly to the bottom of the chamber so that at each stroke of the engine water is drawn from the chamber 11 and discharged into the carbureter C or into the fuel stream at any other place. This device does not act to convey water vapor to the fuel stream but takes unvaporized water. This is for the reason that approximately a half teaspoonful of water is carried into the carbureter of the engine at each explosion or at each intake stroke. At least this is true for a twenty-two horse-power engine and obviously it would require a relatively large boiler to supply vapor equivalent to the half teaspoonful of water at each stroke of the engine. I have found that with this device the engine will not backfire or spit, that knocking is eliminated and that stopping after the load is off the engine is all avoided.

I claim:—

A device of the character described comprising a transparent chamber having an upper and a lower head, the lower head having a drainage cock, a valved supply pipe entering the upper head and adapted to be connected to a source of water, an overflow pipe leading from the upper head, and an outlet pipe extending through the upper head and having its opening disposed adjacent the lower head, said outlet pipe having a branch and a valve seat disposed below the branch, and a needle valve extending through the upper end of said outlet pipe and coacting with the valve seat to control the amount of water discharged therefrom.

In testimony whereof I hereunto affix my signature.

GUSTAV E. KRAUSE.